United States Patent [19]

Ravault

[11] 3,907,579
[45] Sept. 23, 1975

[54] MANUFACTURE OF POROUS CERAMIC MATERIALS

[75] Inventor: Frank Ernest George Ravault, Birmingham, England

[73] Assignee: Foseco International Limited, Birmingham, England

[22] Filed: Dec. 29, 1972

[21] Appl. No.: 319,849

[30] Foreign Application Priority Data
Jan. 14, 1972  United Kingdom................. 1930/72

[52] U.S. Cl.................................... 106/41; 264/44
[51] Int. Cl.² ........................................ C04B 35/00
[58] Field of Search ......... 106/41, 40 R, 86; 264/44

[56] References Cited
UNITED STATES PATENTS
3,408,180  10/1968  Winkler........................... 264/44 X
3,567,807  3/1971  Shannon........................... 106/41 X
3,572,417  3/1971  Wismer............................. 106/86 X
3,573,941  4/1971  Edwards........................... 106/86 X

*Primary Examiner*—Patrick P. Garvin
*Assistant Examiner*—John F. Niebling
*Attorney, Agent, or Firm*—Cushman, Darby & Cushman

[57] ABSTRACT

Permeable ceramic structures are made by impregnating an organic foam with a slurry of finely divided ceramic material, the slurry containing a high concentration of anti-foaming agent, and drying and firing the so-impregnated foam.

3 Claims, No Drawings

MANUFACTURE OF POROUS CERAMIC MATERIALS

This invention relates to the manufacture of porous ceramic materials.

Methods of making porous ceramic materials are described in British patent specification Nos. 923862, 916784, 1004352, 1019807, 1054421. In these methods the general procedure is to take a body of porous organic foam material, e.g. polyurethane foam, impregnate the foam with a slurry of finely divided ceramic material, usually in water, and finally dry and fire the so-obtained structure. The organic foam disappears on firing to leave a ceramic structure. In order to ensure coherence the slurry may contain a binder such as a clay, a phosphate or sodium silicate.

A difficulty arises if the methods described in the specifications noted are carried out due to an insufficient tendency of the ceramic slurry to wet the material of the foam and a tendency to form "bridges" and "cell walls" or "windows" in the foam structure. If such "windows" remain coherent during firing, then the final permeability of the fired product is undesirably low for certain applications, e.g. catalyst supports, dispersion breakers, and gas/liquid contact devices. This is of particular inconvenience when the starting organic foam material is selected to be a very permeable foam — e.g. a reticular foam without cell walls or windows.

The addition of wetting agents helps the slurry wet the material of the foam but does not in any way reduce the tendency to bridging and window formation; in fact such tendency is generally enhanced.

We have now found that the bridging difficulty referred to may be avoided and porous materials of very high permeabilities produced if the impregnation slurry of finely divided ceramic material contains a very high proportion of an anti-foaming agent known per se.

According therefore to the present invention there is provided a method of making a permeable ceramic structure which comprises impregnating an organic foam with a slurry of a finely divided ceramic material, the slurry containing a high concentration of anti-foaming agent, and drying and firing the so-impregnated foam.

The concentration of anti-foaming agent necessary in order to avoid the bridging difficulty may vary with the particular anti-foaming agent used, the slurry type and contents, but will be very much higher than the amount of agent which would normally be used to prevent foaming of the slurry. Preferably, the slurry contains at least 0.1% by weight (calculated as anti-foaming agent) of anti-foaming agent in order for the non-bridging effects to be apparent.

It is convenient to use commercially available anti-foaming agents. There are two classes of material widely available for the purpose: silicones and high molecular weight alcohols. Experience has shown that, in the method of the present invention, either type may be used to good effect but that a mixture of the two types generally gives best results. Heretofore these materials were used at concentrations of only a few parts per million to give the desired anti-foaming effect. Commercial anti-foaming agents may be produced as solutions or emulsions usually containing 10–40% by weight of active material and this should be noted when the actual content of foaming agent per se is to be adjusted to a desired level.

The following examples will serve to illustrate the invention:

EXAMPLE I

A piece of reticular polyester polyurethane foam having between 13 and 17 pores (or cells) per linear centimetre was cut to the desired shape and treated with an anionic polyacrylamide according to the teaching of our copending application Ser. No. 1929/72 (F.S.707) of even date. A ceramic slip was prepared to the following composition,

|  | parts by weight |
|---|---|
| Dextrin | 20 |
| Nepheline Syenite all less than 0.075mm | 35 |
| Kaolin | 25 |
| Fused Mullite all less than 0.075mm | 70 |
| Water | 80 | by stirring all the ingredients together with a high speed stirrer. To each litre of slip was added 5 ml. of SILCOLAPSE 5000 (a silicone antifoaming agent containing 30% by weight active material) plus 5 ml. of PERMANAL ANA (a high molecular weight alcohol). The foam was soaked in the slip. Surplus slip was then removed by centrifuging and the foam dried by microwave heating. The dried foam was then dipped in the slip a second time, centrifuged, dried, then transferred to an electric muffle furnace, where it was heated, at a rate not exceeding 100°C/hr. to a temperature of 300°C, held at 300°C for 4 hours, then heated at a rate not exceeding 100°C/hr. to a temperature of 1300°C, held at 1300°C for 16 hours, then cooled to room temperature at a maximum rate of 100°C/hr. and preferably no more than 50°C/hr. A strong, highly permeable reticular porcelain ceramic body substantially free from "bridges", "cell walls" or "windows" was obtained.

EXAMPLE II

A piece of reticular polyester polyurethane foam having between 20 and 30 pores (or cells) per linear cm was cut to the desired shape and treated with an nonionic polyacrylamide according to the teaching of our copending application Ser. No. 1929/72 (F.S.707) of even date. A ceramic slip was prepared to the following composition,

|  | parts by weight |
|---|---|
| Dextrin | 13 |
| Nepheline Syenite all less than 0.075mm | 23 |
| Kaolin | 17 |
| Micronized Alumina all less then 0.01mm | 47 |
| Water | 80 |
| Monoethanolamine | 6 | by stirring all the ingredients together with a high speed stirrer. To each litre of slip was added 8 ml. of Antifoam Emulsion RD, a silicone anti-foaming agent emulsion containing 10% by weight active material. The foam was then soaked in the slip, surplus slip removed by centrifuging and the foam dried by microwave heating. The dried foam was again immersed in the slip, centrifuged and dried, then fired in an electric muffle furnace with the same temperature schedule as described in Example I. A strong, highly permeable reticular ceramic body of high alumina porcelain was obtained, substantially free from "windows" as described above.

EXAMPLE III

A piece of reticular polyester polyurethane foam having between 4 and 6 pores per linear cm was cut to the desired shape and treated with a nonionic polyacrylamide according to the teaching of our copending application Ser. No. 1929/72 (F.S.707) of even date. A ceramic slip was prepared by stirring together the ingredients of the following composition with a high speed stirrer.

|   | parts by weight |
|---|---|
| Petalite all less than 0.075 mm | 70 |
| Kaolin | 30 |
| Dextrin | 25 |
| Water | 100 |

To each litre of slip was added 22.5 ml. of PERMANAL ANA. The foam was then soaked in the slip, surplus slip removed by centrifuging and the foam dried. Owing to the very open nature of the foam quoted in this example, it is sufficient to employ a current of hot air to dry the slip-coated foam.

The dried foam was again immersed in the slip, centrifuged and dried, then placed in a closed saggar in a gas-fired kiln and heated to 1290°C at a rate not exceeding 100°C/hr., maintained at 1290°C for 14 hours, then the kiln was closed down and its contents allowed to cool inside it. The average rate of cooling was 50°C/hr. A strong, very highly permeable reticular body of thermal shock resistant ceramic was obtained, substantially free from the defect of "windows" described above.

The purpose of the dextrin mentioned in the above Examples is first to bind the particulate matter securely to the polyurethane substrate after drying but before stirring, and secondly to carbonize during the firing process to give a carbon skeleton which supports the structure over the temperature range between the softening and decomposition of the polyester polyurethane (200°–300°C) and the onset of ceramic bonding (about 1000°C, depending on the recipe). This skeleton is eventually burnt out and no trace of it remains in the final product. The binding of particulate matter in the unfired article can also be improved by application of polyacrylamide solution (as taught in our copending application Ser. No. 1929/72), and drying, between the first and second coats of ceramic slip.

I claim as my invention:

1. In the method of making a permeable ceramic structure which comprises impregnating an organic foam with a slurry of a finely divided ceramic material, and drying and firing the so-impregnated foam, the improvement which comprises including at least 0.1% by weight of anti-foaming agent in the slurry.

2. The method of claim 1 wherein the anti-foaming agent is selected from the class consisting of silicones and high molecular weight alcohols.

3. The method of claim 1 wherein the anti-foaming agent is a mixture of at least one silicone and at least one high molecular weight alcohol.

* * * * *